(12) United States Patent
Mei et al.

(10) Patent No.: US 7,459,835 B1
(45) Date of Patent: Dec. 2, 2008

(54) LOADING-PROTECTED BENDING MICROACTUATOR IN ADDITIVE SUSPENSIONS

(75) Inventors: Shijin Mei, Temecula, CA (US); Steve Misuta, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 271 days.

(21) Appl. No.: 11/507,227

(22) Filed: Aug. 21, 2006

Related U.S. Application Data

(60) Provisional application No. 60/832,547, filed on Jul. 20, 2006, provisional application No. 60/813,543, filed on Jun. 13, 2006, provisional application No. 60/780,179, filed on Mar. 6, 2006.

(51) Int. Cl.
*H01L 41/08* (2006.01)
(52) U.S. Cl. .................... 310/330; 360/294.4
(58) Field of Classification Search ......... 310/330–332; 360/294.4, 294
See application file for complete search history.

(56) References Cited

U.S. PATENT DOCUMENTS

| | | | |
|---|---|---|---|
| 6,215,629 B1 * | 4/2001 | Kant et al. ................. 360/290 |
| 6,515,834 B1 * | 2/2003 | Murphy ..................... 360/294.4 |
| 6,538,854 B2 | 3/2003 | Koganezawa et al. | |
| 6,590,748 B2 * | 7/2003 | Murphy et al. ............ 360/294.4 |
| 6,680,825 B1 * | 1/2004 | Murphy et al. ............ 360/294.4 |
| 6,680,826 B2 | 1/2004 | Shiraishi et al. | |
| 6,856,075 B1 | 2/2005 | Houk et al. | |
| 7,016,159 B1 | 3/2006 | Bjorstrom et al. | |
| 7,177,119 B1 | 2/2007 | Bennin et al. | |
| 2003/0123196 A1 | 7/2003 | Shiraishi et al. | |

\* cited by examiner

*Primary Examiner*—Mark Budd
(74) *Attorney, Agent, or Firm*—Intellectual Property Law Office of Joel D. Voelzke

(57) ABSTRACT

A microactuated disk drive suspension for supporting a slider at a disk includes a load beam extending in a plane and having on a common axis a base section adapted for mounting to an actuator, a spring section and a beam section carrying a flexure and the slider thereon. The suspension has relatively movable proximate and distal portions on the common axis that are joined by a bending system cantilevered from the proximate portion and including a cantilevered bending motor opposed to the common axis and having a laterally bendable unsupported region. A cantilevered laterally bendable load assist structure defined by the suspension edges is provided arranged to block undue loading of the bending motor unsupported region.

45 Claims, 9 Drawing Sheets

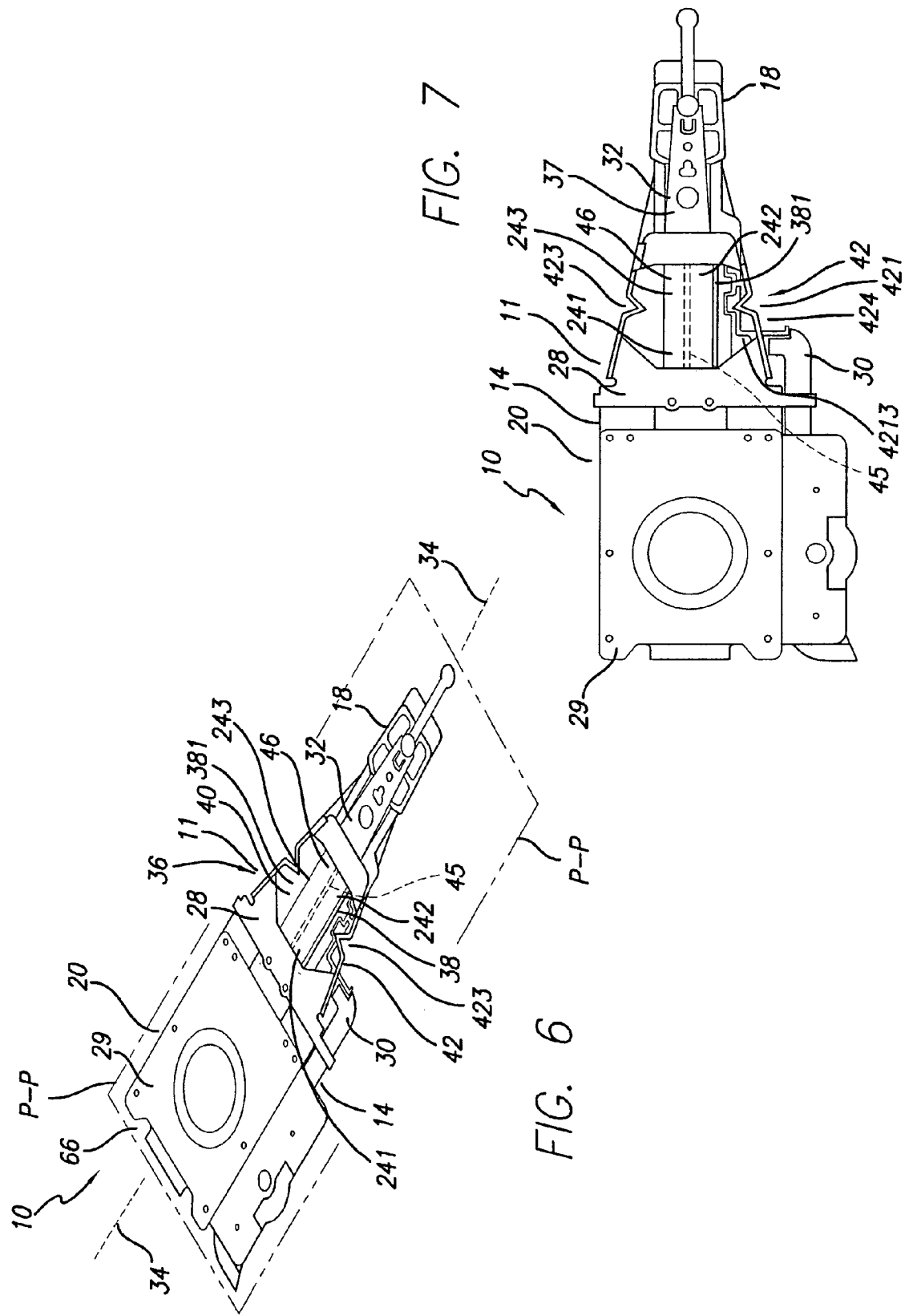

LOADING-PROTECTED BENDING MICROACTUATOR IN ADDITIVE SUSPENSIONS

CROSS-REFERENCE TO RELATED APPLICATIONS

This application claims the benefit of U.S. Provisional Application Ser. No. 60/780,179, filed Mar. 6, 2006, further claims the benefit of U.S. Provisional Application Ser. No. 60/813,543, filed Jun. 13, 2006, and still further claims the benefit of U.S. Provisional Application Ser. No. 60/832,547, filed Jul. 20, 2006.

BACKGROUND OF THE INVENTION

1. Field of the Invention

This invention relates to disk drive suspensions, and more particularly to microactuated suspensions in which a bending motor such as a differentially polarized single PZT having an unsupported bending region is used to finely position the slider at a disk.

2. Description of the Related Art

Bimorphs are shown in U.S. Pat. No. 3,447,217 to Kumada and U.S. Pat. No. 5,850,109 to Mock et al; the use of bimorphs and bending motors employing bimorphs for minute shifts of relatively moving parts is shown in U.S. Pat. No. 4,367,504 to Seki and others. Use of bending motors in disk drive suspensions for fine positioning of transducers is shown in various patents including U.S. Pat. No. 4,099,211 to Hathaway, U.S. Pat. No. 4,374,402 to Blessom et al, U.S. Pat. No. 5,898,544 to Krinke et al, and U.S. Pat. No. 6,515,834 to Murphy et al. The use of single PZTs as bending motors are shown in these patents: SG 67994 granted Apr. 17, 2001 to Xi et al, U.S. Pat. No. 6,327,120 to Koganezawa et al, U.S. Pat. No. 6,680,825 to Murphy et al, U.S. Pat. No. 6,680,826 to Shiraishi et al, and U.S. Pat. No. 6,859,345 to Boutaghou et al. Complex proposed structures and a failure to take properly into account the frailty of the bending motors have limited the adoption of these ideas in disk drive suspensions.

BRIEF SUMMARY OF THE INVENTION

There is a need to provide an effective bending motor for disk drive suspensions that is economical, simple, and free of the damage potential that is found in the prior art. It is an object of the present invention therefore to provide and improved disk drive suspension. It is a further object to provide an improved disk drive suspension that uses but a single bending motor PZT. A further object is to laterally relatively shift respective suspension portions for slider placement opposite a disk track using the single PZT free of added pivot structure. A further object is to simplify and thus lower the cost of electrical connection to the PZT. Yet another object is to provide indicia on the PZT enabling visual determination of correct polarity a feature combinable with dividing the PZT asymmetrically rather than symmetrically. A further object is to provide a single PZT having one common ground electrical connection and at least two opposing connections to enable bending of the PZT by appropriate application of suitable sign voltages relative to the predetermined polarity of the PZT portions. A further object is application of a single polarity voltage to an oppositely direction poled pair of PZT portions for bimorph response of bending, or application of a positive or negative voltage to like pole direction paired portions for a bimorph response of bending.

These and other objects of the invention to become apparent hereinafter are realized in a microactuated disk drive suspension comprising relatively movable proximate and distal suspension portions on a common axis joined by a bending system cantilevered from a suspension portion and consisting of a cantilevered bending motor opposing the common axis and having a laterally bendable region free of attached support, and a cantilevered laterally bendable load assist structure extending along and spaced from the bending motor and arranged to block undue loading of the bending motor unsupported region.

In a further embodiment, the invention provides a microactuated disk drive suspension comprising relatively movable proximate and distal suspension portions on a common axis solely joined by a bending system cantilevered from a suspension portion and consisting of a cantilevered bending motor opposing the common axis and having a laterally bendable, unsupported region, and a cantilevered laterally bendable load assist structure extending along and spaced from the bending motor and preferentially bendable to bend in preference to bending of the suspension portions and arranged to block undue loading of the bending motor unsupported region.

In a further embodiment, the invention provides a microactuated disk drive suspension comprising mechanical pivot connection-free, relatively movable proximate and distal suspension portions on a common axis joined by a bending system cantilevered from a suspension portion and comprising a cantilevered bending motor having a laterally bendable, unsupported region, and a cantilevered laterally bendable load assist structure extending along and spaced from the bending motor and arranged to block undue loading of the bending motor unsupported region.

In this and like embodiments, typically, the bending motor comprises a PZT, the PZT bending motor comprises a differentially responsive PZT between opposed electrodes arranged to differentially expand or contract the PZT in lateral bending relation. The PZT bending motor comprises a single PZT having opposite-direction poled portions between opposed electrodes arranged to differentially expand or contract the PZT in lateral bending relation, or the PZT bending motor comprises a single PZT having like-direction poled portions between opposed electrodes arranged to differentially expand or contract the PZT in lateral bending relation, The opposed electrodes include a grounding electrode and a split electrode opposite the grounding electrode, the split electrode is symmetrically divided into first and second parts, the PZT having differentially responsive portions corresponding to the split electrode first and second parts, or the split electrode is asymmetrically divided into first and second parts, the PZT having differentially responsive portions corresponding to the split electrode first and second parts, the PZT is elongated and less thick than wide, the split electrode is elongated and has first and second longitudinally split parts, and the grounding electrode is common to both the parts, the split electrode is split longitudinally with its the first and second parts having a like charge, the PZT having first and second portions opposite the split electrode first and second parts respectively, the PZT portions being opposite direction poled, or the split electrode is split longitudinally with its first and second parts having a different charge, the PZT having first and second portions opposite the split electrode first and second parts respectively, the PZT portions being same direction poled.

In a more particular embodiment, the invention provides a microactuated disk drive suspension for supporting a slider at a disk, the suspension comprising a mount plate, a load beam extending in a plane and having on a common axis a base section adapted for mounting to an actuator, a spring section and a beam section carrying a flexure and the slider thereon, the suspension having relatively movable proximate and distal portions on said common axis and joined by a bending system cantilevered from the proximate portion and comprising a cantilevered bending motor opposed to said common axis and having a laterally bendable unsupported region, and a cantilevered laterally bendable load assist structure arranged to block undue loading of the bending motor unsupported region.

In this and like embodiments, typically, the suspension plane has a first side and a second side, the suspension having left and right edges defining the load assist structure, the bending motor is located at the suspension plane first side and distal to said spring section, or the bending motor is located at the suspension plane second side and distal to said spring section, the suspension proximate and distal portions are longitudinally spaced across a gap, the bending motor having respective ends fixed to the respective portions with its unsupported region between the ends and opposite the gap, the load assist structure comprising locally deflected rails extending between the suspension proximate and distal portions and traversing the gap on the left and right edges of the suspension, the rails are each doubly deflected between said suspension proximate and distal portions, the rails are deflected on a constant radius, or the rails are deflected on a varying radius, the bending motor has a proximate end and a distal end with said unsupported region therebetween and is otherwise free of attachment, the bending system alone supports the distal portion from the proximate portion, the suspension is free of a mechanical pivoting connection between the proximate and distal portions other than the bending system, the bending motor comprises a PZT e.g. a differentially responsive PZT between opposed electrodes arranged to differentially expand or contract the PZT in lateral bending relation, the PZT bending motor comprises a single PZT having opposite-direction poled portions between opposed electrodes arranged to differentially expand or contract the PZT in lateral bending relation, or the PZT bending motor comprises a single PZT having like-direction poled portions between opposed electrodes arranged to differentially expand or contract the PZT in lateral bending relation, the opposed electrodes include a grounding electrode and a split electrode opposite the grounding electrode, the split electrode is symmetrically divided into first and second parts, the PZT having differentially responsive portions registered respectively with the split electrode first and second parts, or the split electrode is asymmetrically divided into first and second parts, the PZT having differentially responsive portions registered respectively with the split electrode first and second parts, the PZT is elongated and less thick than wide between the opposed electrodes, the split electrode is elongated and has first and second longitudinally split parts in registered relation with the PZT portions, the grounding electrode being common to both the parts, the split electrode is split longitudinally with its first and second parts having a like charge, or the PZT has first and second portions opposite the split electrode first and second parts respectively, the PZT portions being different direction poled, the split electrode is split longitudinally with its the first and second parts having a different charge, the PZT having first and second portions opposite the split electrode first and second parts respectively, the PZT portions being same direction poled, the microactuated disk drive suspension further includes a mounting plate, and a flexible circuit carried by the suspension.

In its method aspects the invention provides a method of manufacturing a disk drive suspension including providing relatively movable proximate and distal portions and coupling the portions with a bending system cantilevered from the proximate portion and comprising a cantilevered bending motor having a laterally bendable unsupported region, and a cantilevered laterally bendable load assist structure arranged to block undue loading of the bending motor unsupported region.

In a further method aspect, the invention disk drive suspension operating method includes positioning a slider with the suspension, and bending the suspension between relatively movable proximate and distal portions thereof with a bending system cantilevered from the proximate portion and comprising a bending motor having a laterally bendable unsupported region, and a cantilevered laterally bendable load assist structure arranged to block undue loading of the bending motor unsupported region.

In these and like embodiments, typically, the suspension has edges and further includes defining the load assist structure with the suspension edges and selecting a PZT as the bending motor.

In a further method aspect, the invention includes a method of marking poling directions in a single PZT device having simultaneously different poling directions, including determining the location of the boundary between device portions having different poling directions, and placing visually detectable indicia on a surface of the device at the boundary in a manner providing asymmetrically sized first and second surface areas on either side of the boundary at least one of which areas corresponds to a single poling direction in the device.

The invention further provides a product of the foregoing method and, more particularly a PZT device having differently poled portions on opposite sides of a boundary, device having visually detectable indicia on a surface thereof at the boundary, the indicia defining asymmetrically sized first and second surface areas at least one of which corresponds to a single poling direction.

BRIEF DESCRIPTION OF THE SEVERAL VIEWS OF THE DRAWINGS

The invention will be further described in conjunction with the attached drawings in which:

FIG. 6 is an oblique top view of a further embodiment of the invention;

FIG. 7 is a top plan view thereof;

DETAILED DESCRIPTION OF THE INVENTION

The invention overcomes the prior art difficulties of employing a single differentially responsive bending motor in effective microactuation of a disk drive suspension, e.g. by having the bending portion of motor unsupported and untrammeled by attachment to a support, and protecting the unsupported bending motor portion with a load assist structure, typically suspension edges, preferably in the form of edge runners or rails having localized deflection in various forms to preferentially bend laterally with the bending motor while being stiff to vertical bending to block undue loading of the bending motor by preferentially taking a major part of the loading themselves. While the invention will be described primarily with reference to PZT (lead zirconate titanate) bending motors, other bending motor structures such as those based on other electroactive chemicals, ceramics or polymers, or based on electrostrictive materials can be used.

Like prior art PZT microactuation devices, the present invention can use differential (double poled or different poling direction in different portions) polarizing of the PZT and a common charge on multiple electrodes that are opposed across the PZT, as well as single poled or like direction poling of different portions of the PZT and a differential charge on multiple electrodes that are opposed across the PZT.

Figure 1:
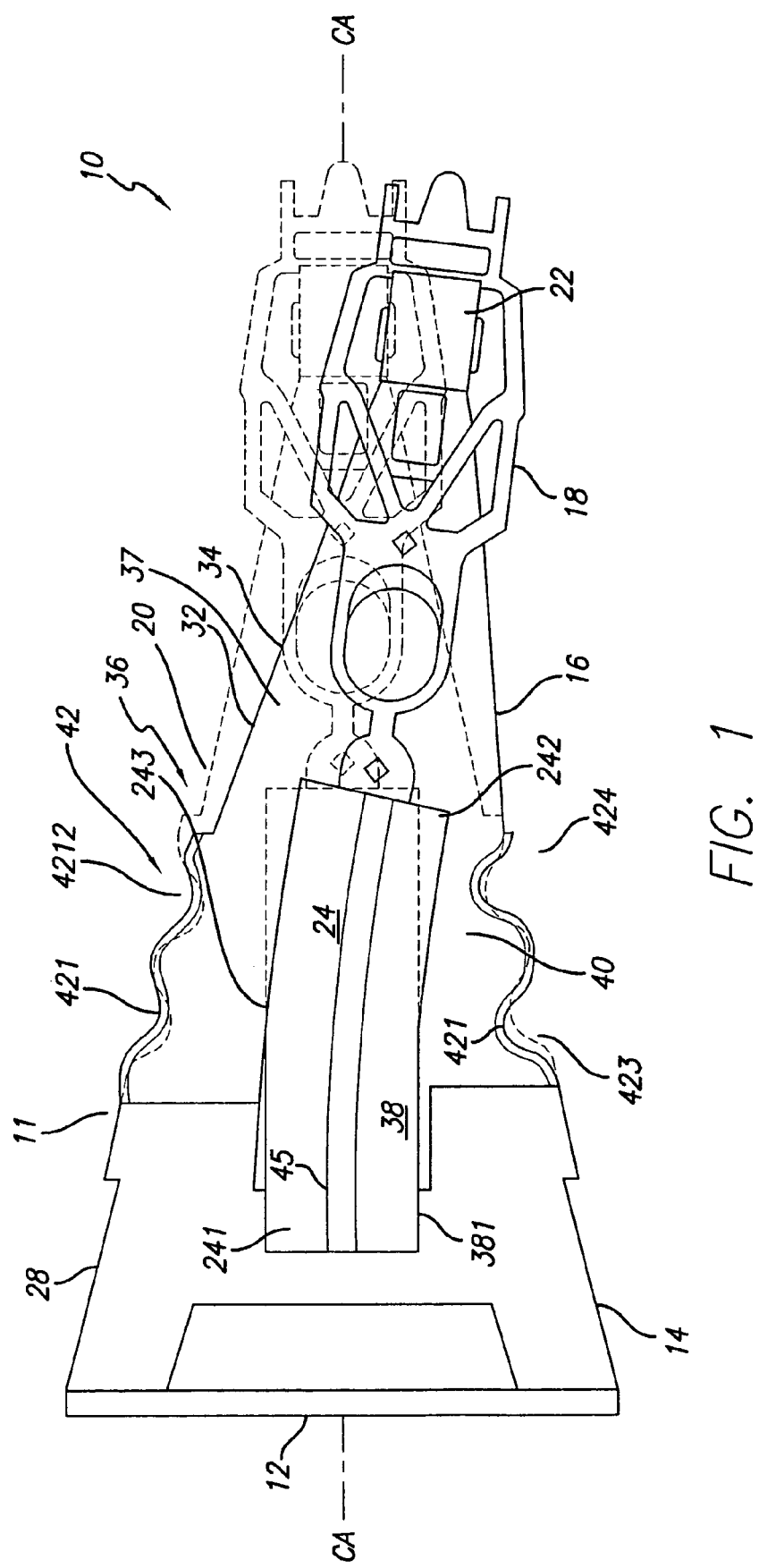
FIG. 1 is a bottom plan view of an embodiment of the invention.

With reference now to the drawings in detail, in FIG. 1 a bottom view of a microactuated suspension is shown at 10 and includes a load beam 20 having an angularly movable base section 12 integral with or attached to a spring section 14 that is integrated with or otherwise attached to a beam section 16. Beam section 16 defines edges 11 and supports a flexure 18 carrying a slider 22 for positioning the slider at a desired track location on a disk (not shown) by shifting the suspension in its lateral plane, left or right, as shown in FIG. 1. "Lateral" herein, and its cognitives, refers to a location or a movement to the side, e.g. horizontal as opposed to vertical i.e. up or down. The suspension 10 is considered by convention to be horizontal, i.e. in a horizontal plane, in the ensuing description, with the slider 22 side, by further convention, being the bottom side and the opposite side being the top side regardless of suspension orientation in a disk drive. The term "lateral" refers to location or movement in that horizontal plane that includes the suspension. A "slider" herein is an aerodynamic body typically carried by a flexure that houses read and/or write heads for positioning above a spinning disk.

Figure 2:
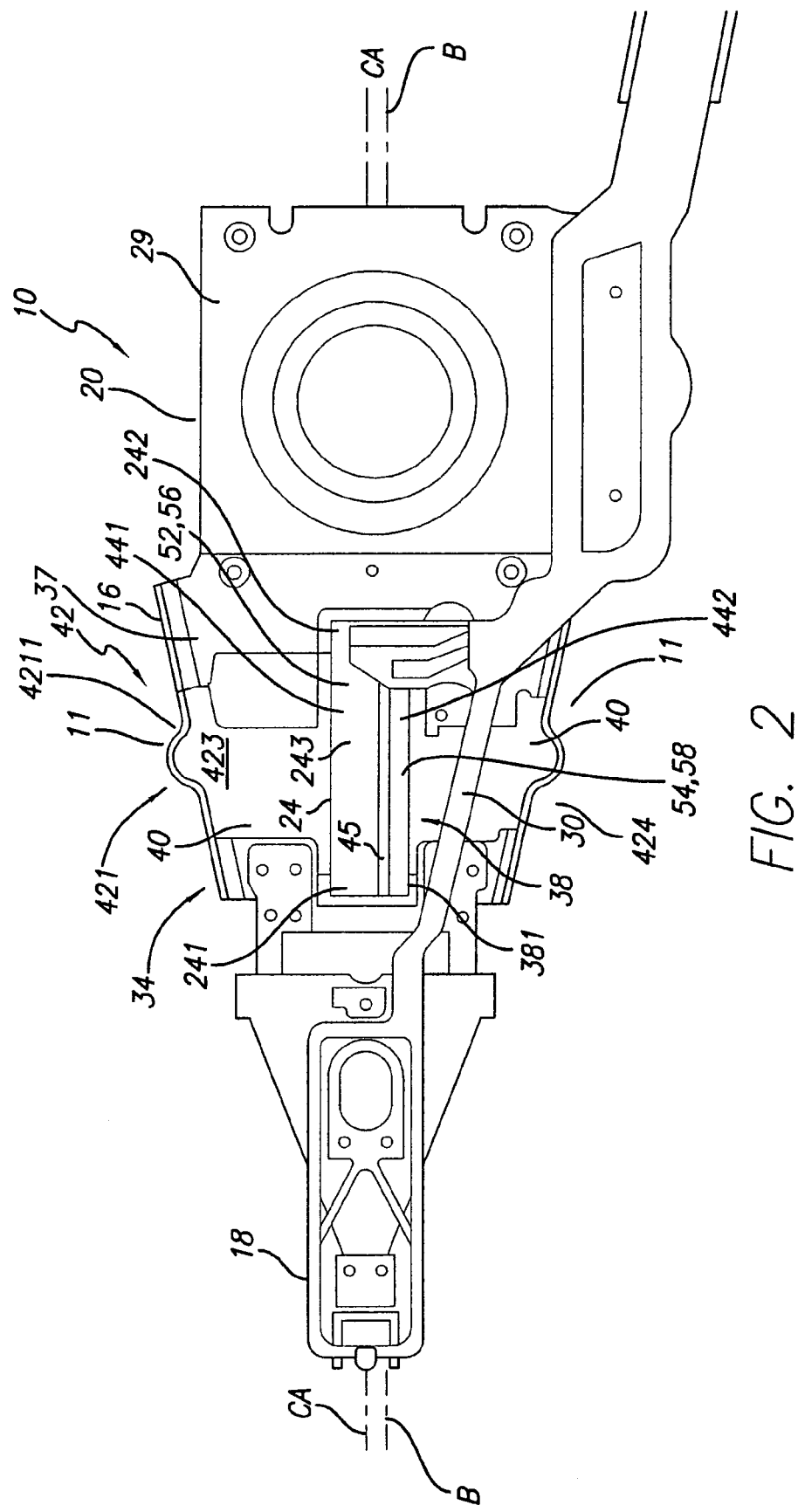
FIG. 2 is a bottom plan view of a further embodiment of the invention.
Figure 3:
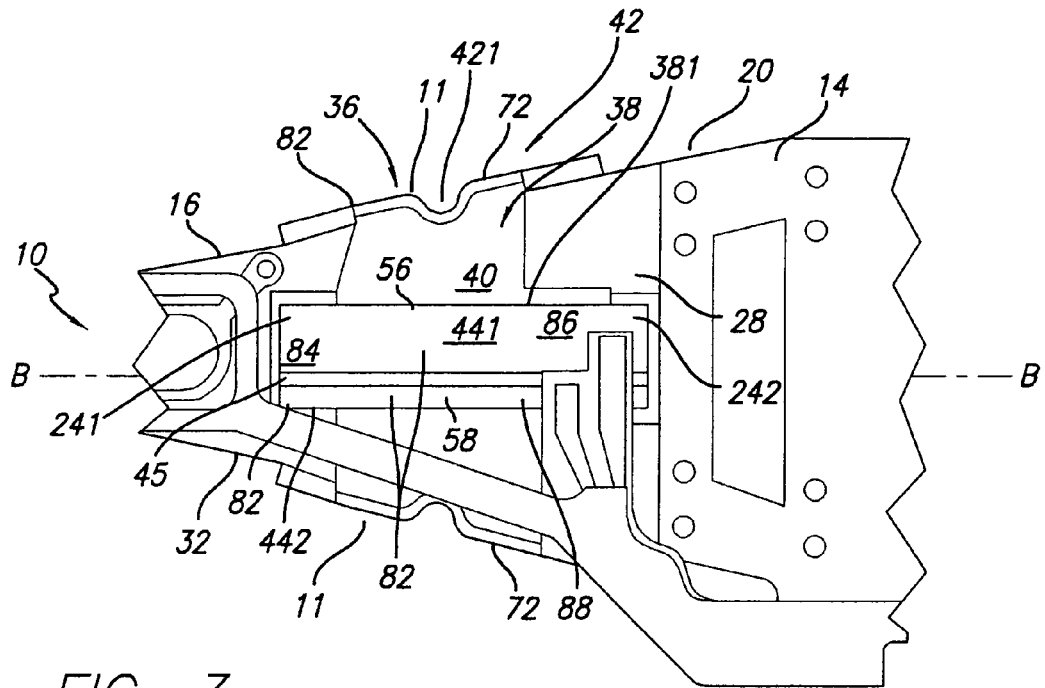
FIG. 3 is a bottom plan view of a further embodiment of the invention.
Figure 4:
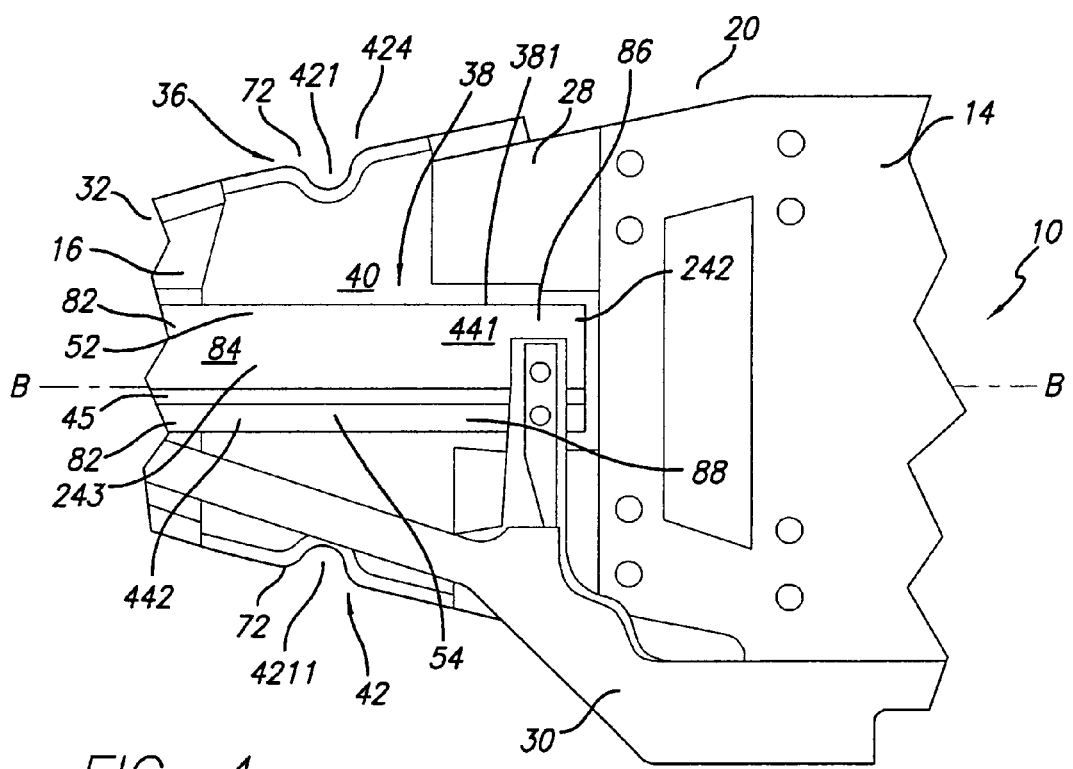
FIG. 4 is a bottom plan view of a further embodiment of the invention.

The invention concerns improved fine positioning of the slider 22 with load beam 20 using a cantilevered microactuator 24 having an unsupported bendable region 243. In FIG. 1 the microactuator is on the bottom (or slider) side 37 of the suspension 10. FIGS. 10-13 show the microactuator 24 on the top (or non-slider) side of the suspension 10. FIGS. 14 and 15 show the microactuator inverted from FIGS. 12 and 13 to have the split 45 between electrodes face towards the suspension. "Unsupported" herein with reference to the region 243 refers to the absence of a secondary structure (i.e. a structure not part of the PZT-based bending motor primary structure, such as a part of the load beam 20) at, under or above, attached or not to, the region, or any secondary structure e.g. one having the effect of increasing region resistance to bending in the lateral plane of intended bending of the microactuator 24 or normal to that lateral plane. "Bendable" herein with reference to the microactuator bendable region 243 refers to the region having the ability to curve on itself in a lateral plane. "Laterally bendable" herein with reference to the load assist structure 42 refers to the structure having the ability to locally fold, suitably at a radius of curvature defined by a deflection in the structure, so as to curve with the bending motor and facilitate the relative movement of the movable portion 32 with respect to the portion 28. "Cantilever" herein refers to a state of having support on one end or one side only. Typically in a suspension the beam section 16 is cantilevered from the base section 12 that is directly supported by a mount plate 29 (FIG. 2). In the invention the microactuator 24 is cantilevered in the sense of being supported at one end or side only and extending between a suspension relatively fixed portion 28 at its directly supported end 241 and a relatively movable portion 32, typically the distal part 34 of the beam section 16, at its indirectly supported or cantilevered end 242. "Free of attached support" and "free of attachment" herein refers to a condition of the unsupported region 243 wherein the region is not fixed to any other structure than the microactuator 24 ends 241, 242.

With reference to FIGS. 1-5, microactuated disk drive suspension 10 includes forward of spring section 14 relatively movable proximate and distal suspension portions 28, 32 respectively, corresponding to the relatively fixed suspension portion 28 and the relatively movable suspension portion 32 just discussed. These proximate and distal portions 28, 32 lie on a common axis 34 extending centrally and longitudinally of the suspension 10. Proximate and distal portions 28, 32 are shown to be joined by a bending system 36 cantilevered from a suspension portion, here proximate portion 28. Bending system 36 in one embodiment consists of microactuator 24 defining a cantilevered bending motor 38 mounted to oppose the common axis 34 either for its full length where the motor is paraxial with the axis 34, or for some portion of its length where some portion of the motor lies across some portion of the common axis.

Bending motor 38 is a typically elongated device capable of dimensional variation responsive to application of a voltage with one device end 241 directly supported by and fixed to the suspension 10 at relatively immovable and proximate portion 28, another end 242 attached to the movable portion 32 with an unsupported (i.e. not directly supported but cantilevered), laterally bendable region 243 between the ends 241, 242 that is free of attached support other than said ends.

The suspension 10 further includes edges 11 and at the edges a cantilevered laterally bendable load assist structure 42 extending along and spaced from the bending motor 38 in the same plane as the bending motor, e.g. FIG. 2, or in a plane parallel to the plane of the bending motor, e.g. FIG. 7, that is arranged to block undue loading of the bending motor unsupported region 243. Load assist structure is preferably predisposed to bend laterally while resisting bending vertically. The provision of locally deflections 421 at a locus 423 along the length of the assist structure 42 defines bending zones 424. Typically, the bending zones 424 have a single deflection 4211 of constant radius, see FIG. 2, or a double deflection 4212 each part of which is of a constant radius, see FIG. 1, or a single deflection 4213 of a nonconstant radius, e.g. a V-shaped deflection, see FIG. 7. Edges 11 are typically fabricated from the material of the suspension, e.g. a spring metal such as stainless steel, and are formed as runners or rails 72 in, above or below the plane P-P of the adjacent suspension portion, e.g. 32, in the thickness of the adjacent portion and typically bent out of the portion plane at an angle or simply extended in the portion plane.

With further reference to FIGS. 1-5, the invention further provides a microactuated disk drive suspension 10 comprising relatively movable proximate and distal suspension portions 28, 32 on a common axis 34 solely joined by a bending system 36 cantilevered from suspension portion 28 and consisting of a microactuator 24 defining a cantilevered bending motor 38 opposing the common axis and having a laterally bendable, unsupported region 243, and a cantilevered laterally bendable load assist structure 42 extending along and spaced from the bending motor and arranged to block undue loading of the bending motor unsupported region. The load assist structure 42 locally deflected, e.g. at 421, to be readily bendable there in preference to bending of the suspension portions, as herein described.

With further reference to FIGS. 1-5, the invention provides a microactuated disk drive suspension 10 embodiment that is mechanical pivot connection-free; that is the relatively movable proximate and distal portions 28, 32 connected by the bendable motor 38 and the load assist structure 42 are free of additional connecting structure that is mechanical (i.e. of sufficient physical size and strength) to act as a fulcrum for pivoting movement of the moving portion 32 relative to the unmoving portion 28. Flexible circuit layers extending between portions 28 and 32, while typically present in a complete suspension 10, are not of sufficient size and strength to act as a fulcrum for pivoting of these portions. In this embodiment, too, the relatively movable proximate and distal suspension portions 28, 32 lie on a common axis 34 joined by a bending system 36 cantilevered from a suspension portion and comprising a microactuator 24 including a cantilevered bending motor 38 having a laterally bendable, unsupported region 243, and a cantilevered laterally bendable load assist structure 42 extending along and spaced from the bending motor and arranged to block undue loading of the bending motor unsupported region.

Figure 11:
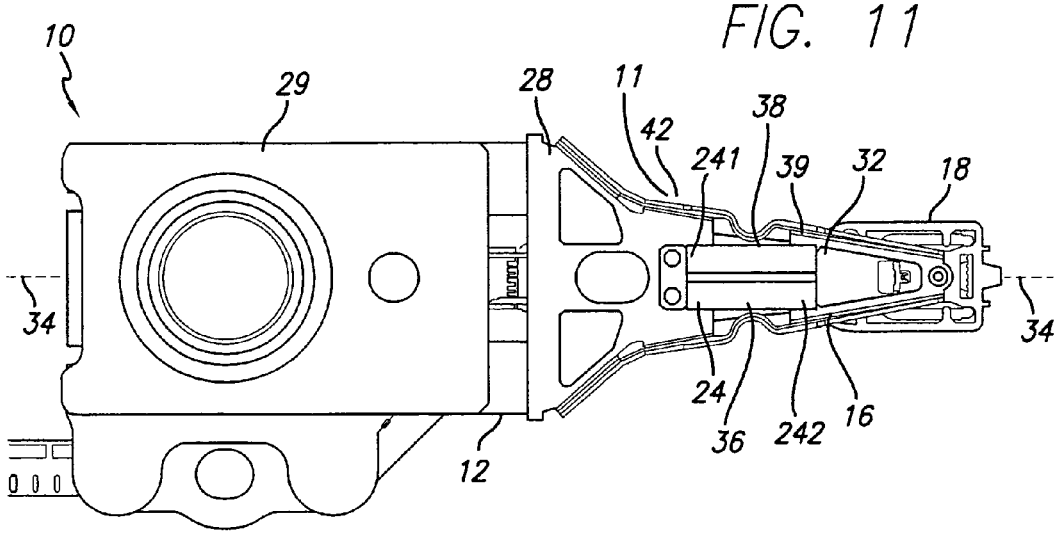
FIG. 11 is a top plan view of a further embodiment.
Figure 12:
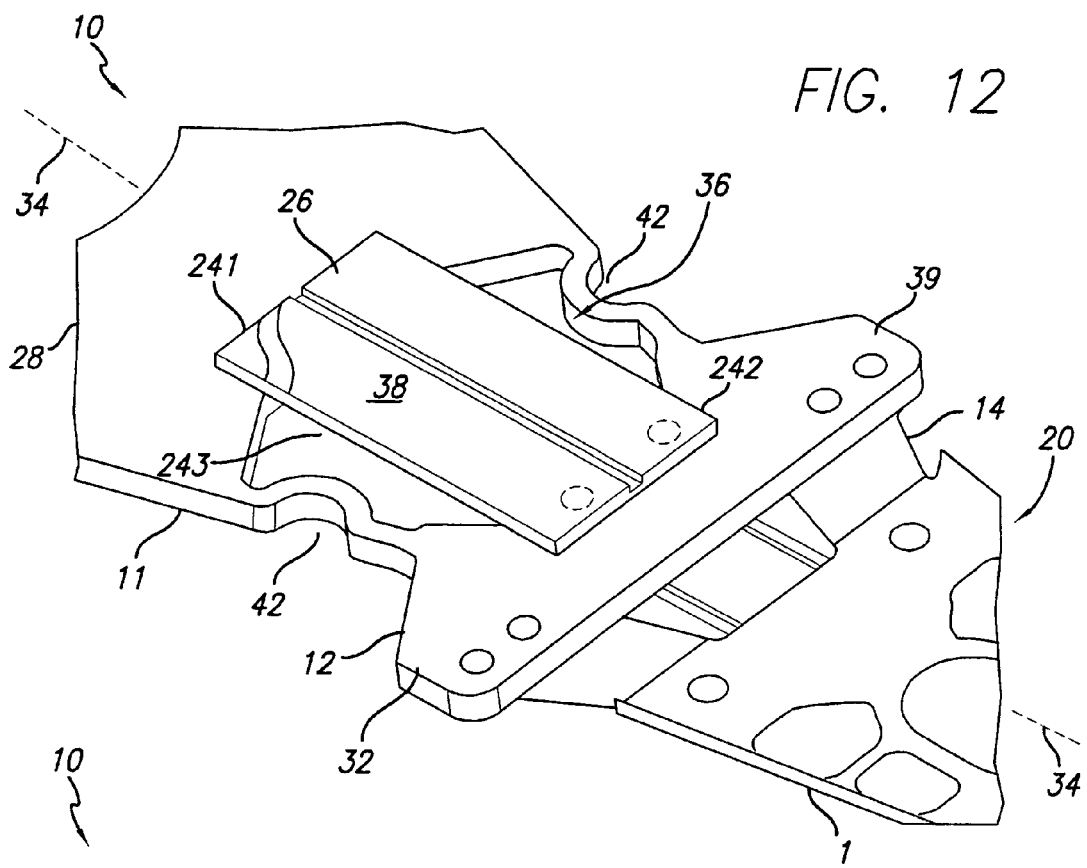
FIG. 12 is a top plan view of a further embodiment.
Figure 13:
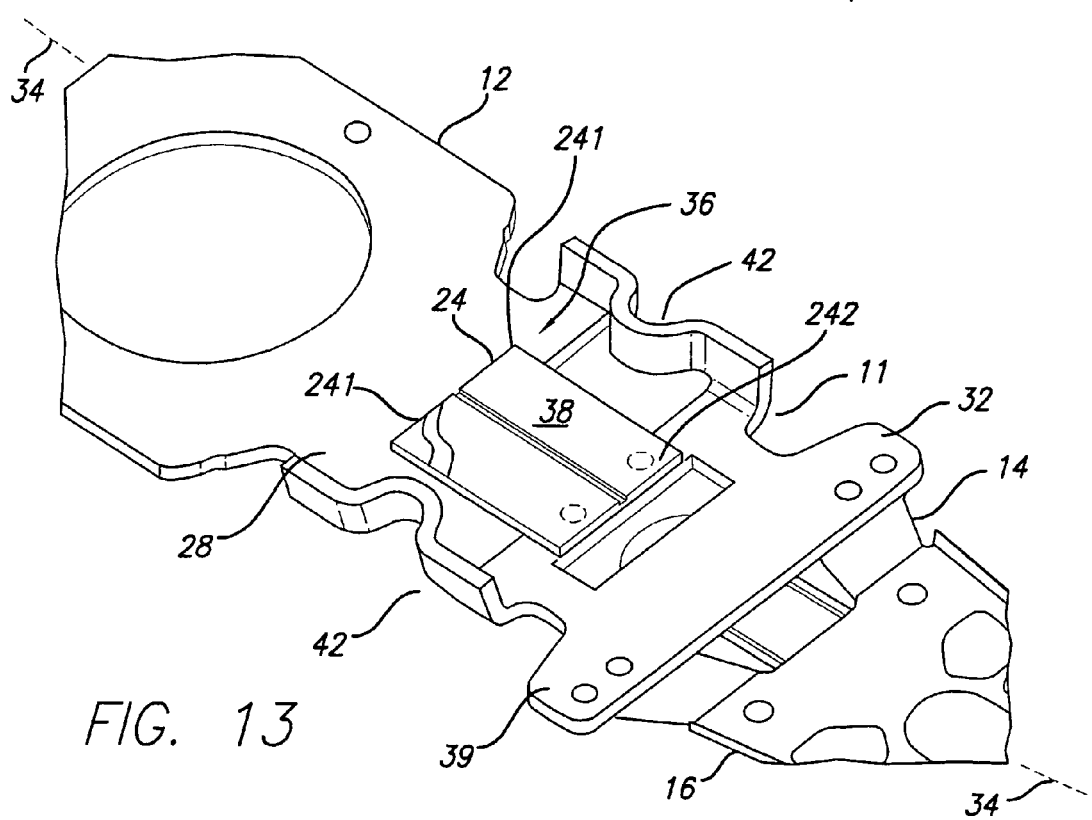
FIG. 13 is a top plan view of a further embodiment.
Figure 14:
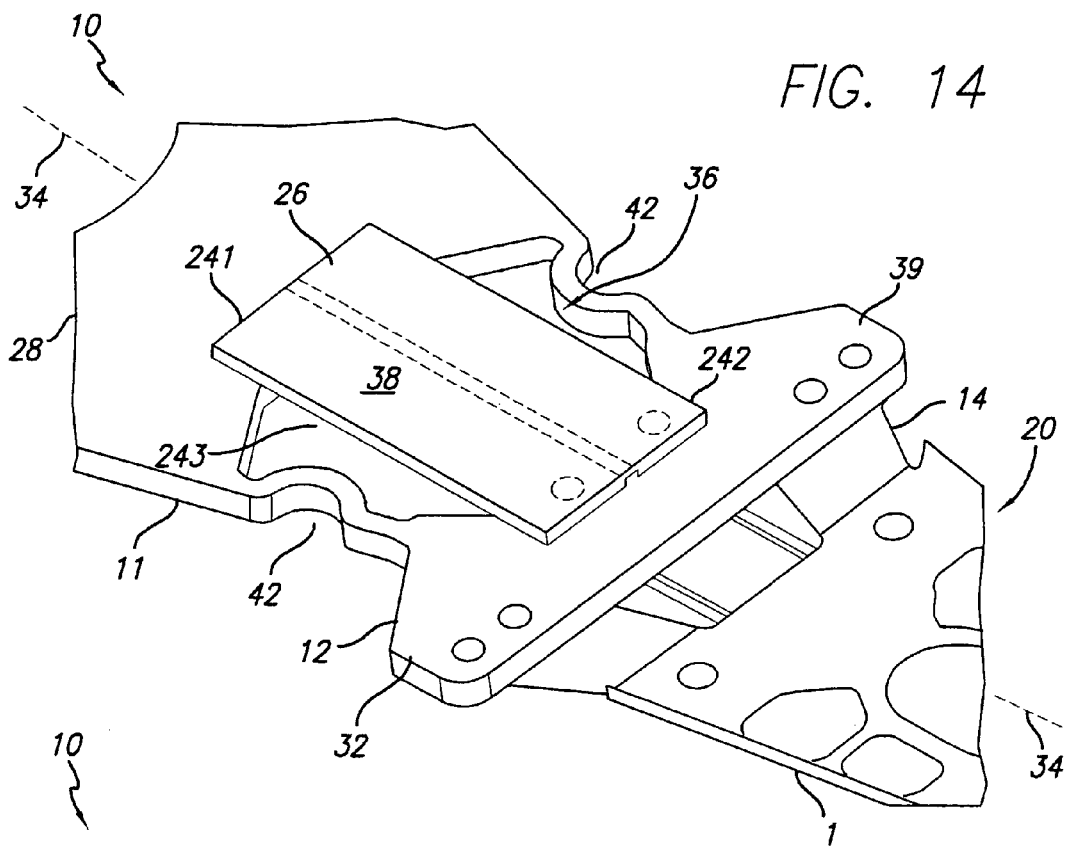
FIG. 14 is a top plan view of a further embodiment.
Figure 15:
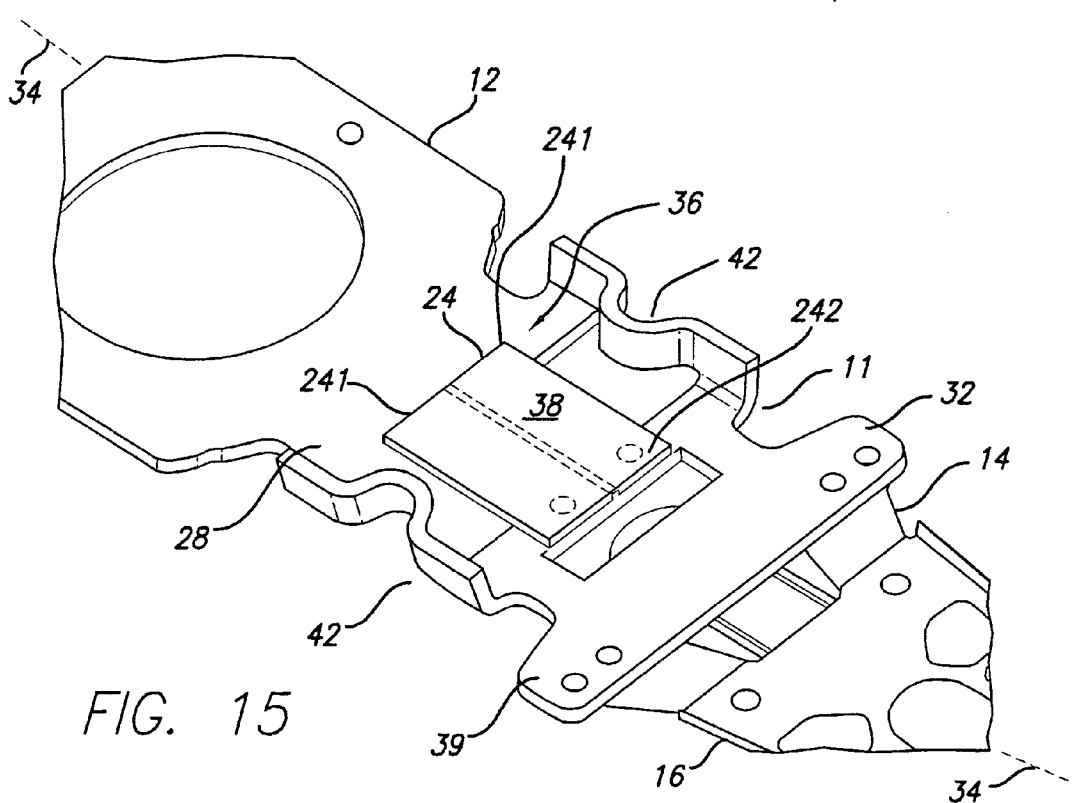
FIG. 15 is a top plan view of a further embodiment.

With reference to FIGS. 1-15, in which like numerals indicate like parts, typically, the microactuator bending motor 38 comprises a PZT 381 that is differentially responsive when positioned between electrodes 44, 46 spaced apart across split 45 usefully defined by the electrodes and facing away from the attached suspension portions 28, 32, e.g. FIGS. 12, 13, or toward the suspension portions, e.g. FIGS. 14 and 15.

Figure 5A:
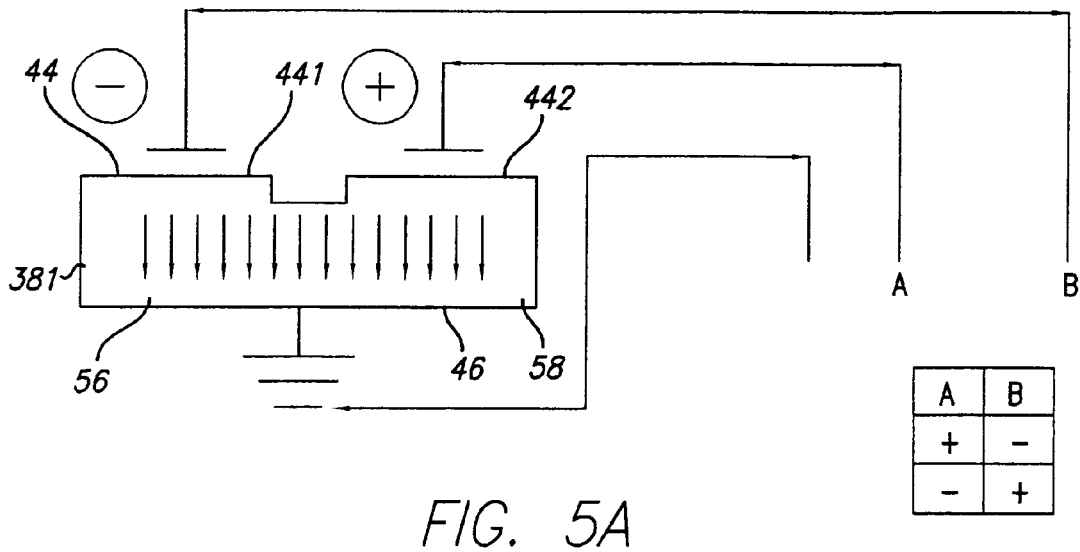
FIGS. 5A and 5B are schematics of electrical connections to single and double poled PZTs.
Figure 5B:
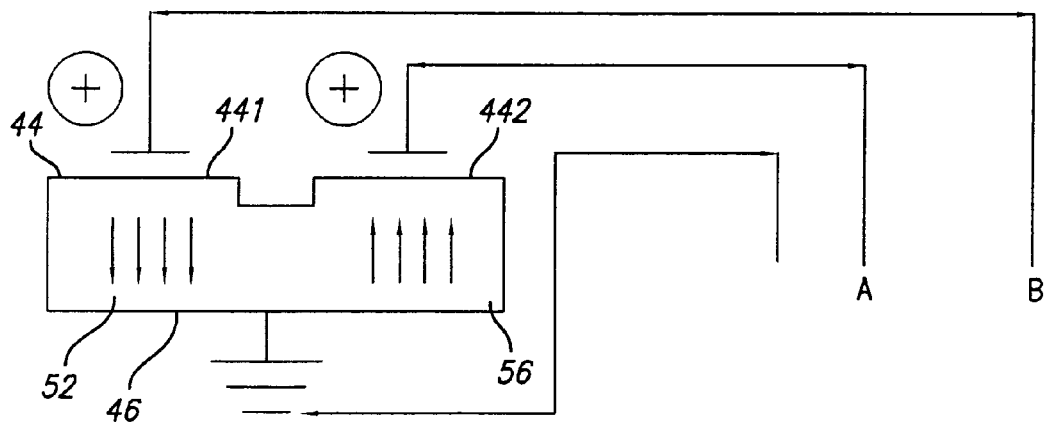
Figure 8:
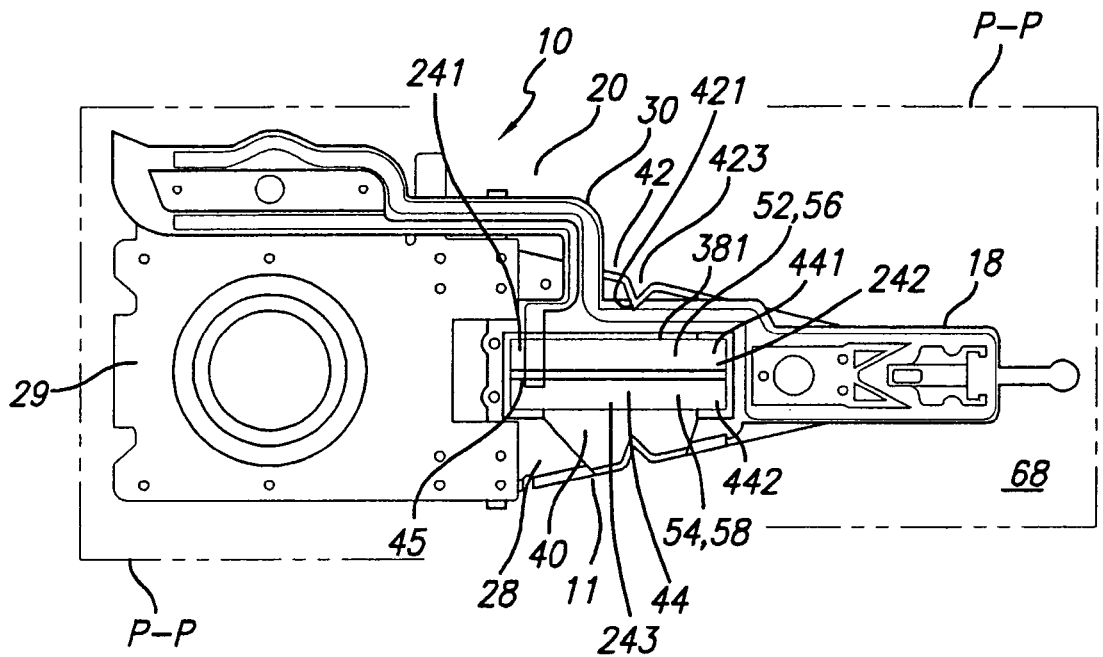
FIG. 8 is a bottom plan view thereof.
Figure 9:
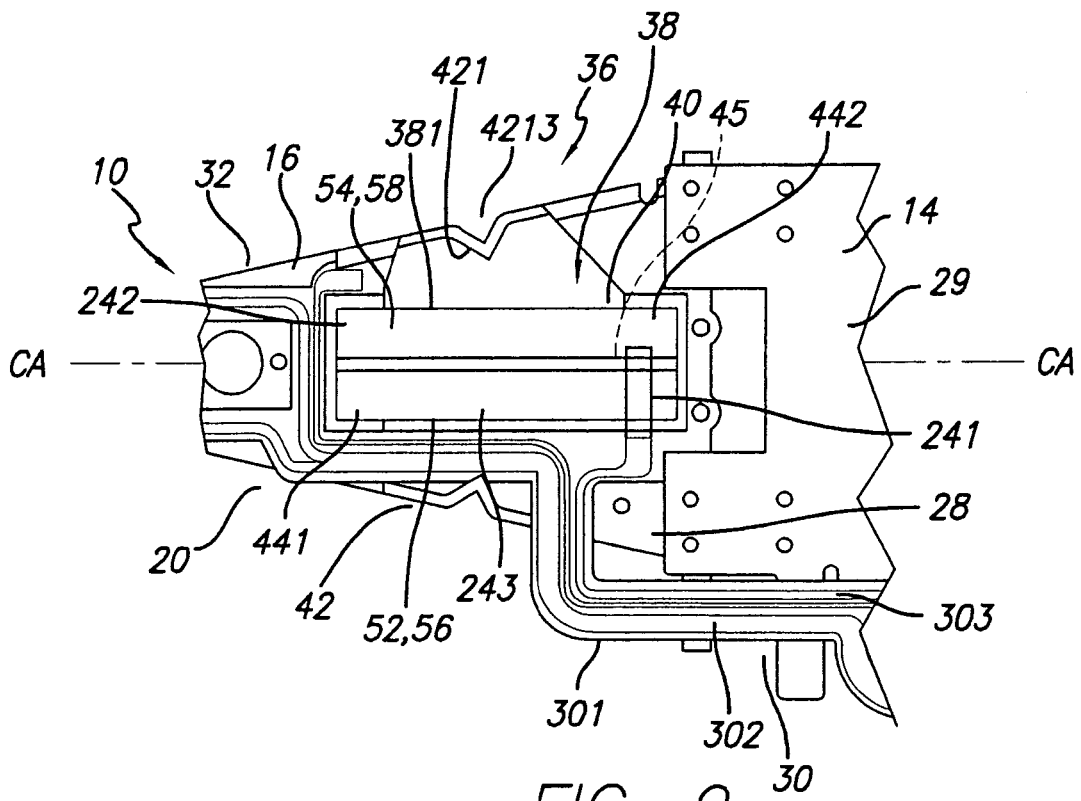
FIG. 9 is an enlarged fragmentary bottom plan view thereof.

The opposed electrodes 44 (symmetrically or asymmetrically divided into parts 441, 442 separated by), 46 that arranged to differentially expand or contract the PZT in lateral bending relation. The PZT bending motor 38 preferably comprises a single PZT 381 having either opposite-direction poled portions 52, 54 (FIG. 5B) between correspondingly dimensioned and opposed electrodes 44 (441, 442), 46 that are arranged to dimensionally vary, i.e. differentially expand or contract the PZT in lateral bending relation, or as schematically depicted in FIG. 5A, the PZT bending motor comprises a single PZT having like-direction poled portions 56, 58 between the opposed electrodes 44, 46 that are arranged to differentially expand or contract the PZT in lateral bending relation. "Single PZT" herein with reference to a PZT device has reference to a crystal or series of crystals between opposed electrodes that act as a unit to bend laterally in their bending region 243.

The opposed (across the PZT 381) electrodes include a grounding electrode 46 and a split electrode 44, 441, 442 opposite the grounding electrode. The split electrode 44 can be symmetrically divided into first and second parts 441, 442 (FIGS. 7-9), the PZT having differentially responsive portions 52, 54 corresponding to the split electrode first and second parts. Or, the split electrode can be asymmetrically divided into first and second parts 441, 442, the PZT 381 having differentially responsive portions 52, 54 corresponding to the split electrode first and second parts. Typically, the PZT is axially elongated along the suspension axis 34 and less thick (dimension between electrodes 44, 46) than wide (dimension transverse to suspension axis 34).

The split electrode 44 is typically correspondingly elongated and wide and has first and second longitudinally split parts 441, 442; the grounding electrode 46 is common to both the parts, i.e. one grounding electrode is used for both parts 441, 442, although the grounding or opposed electrode can also be split.

More specifically, in a preferred mode, the split electrode 44 is split longitudinally (parallel with the suspension axis 34) with its first and second parts 441, 442 having a like charge and PZT 381 first and second portions 52, 54 opposite the split electrode first and second parts respectively are opposite direction poled (double poled PZT). See FIG. 5B. Alternatively, split electrode 44 is split longitudinally with its first and second parts 441, 442 having a different charge, the PZT 381 having first and second portions 56, 58 opposite the split electrode first and second parts 441, 442 respectively and same direction poled (single poled PZT). In either configuration, application of a voltage or potential across the PZT 381 produces a differential dimensional change between portions 52, 54 or 56, 58 and results in the PZT bending correspondingly in its unsupported region 243, defining the bending motor 38.

In a further preferred embodiment, microactuated disk drive suspension 10 supports slider 22 at a disk (not shown). Suspension 10 comprises a load beam 20 extending in a plane P-P and having on a common axis 34 a base section 12 adapted for mounting to an actuator 62, a spring section 14, and a beam section 16 carrying a flexure 18 and the slider 22 thereon. Suspension 10 has relatively movable proximate and distal portions 28, 32 on the common axis 34 and joined by a bending system 36 cantilevered from the proximate portion 28 and comprising a cantilevered bending motor 38 opposed to the common axis and having a laterally bendable unsupported region 243, and a cantilevered laterally bendable load assist structure 42 arranged to block undue loading of the bending motor unsupported region.

Typically, the suspension plane P-P has a first side 66 and a second side 68. Suspension load beam 20 has edge rails 72 that extend at an angle from the load beam to define the load assist structure 42, e.g. at the suspension plane P-P first side 66. The bending motor 38 is located in one embodiment at the suspension plane first side 66, e.g. as shown in FIG. 2. The bending motor 36 can alternatively be located at the suspension plane second side 68, e.g. as shown in FIG. 7.

Further typically, the suspension proximate and distal portions 28, 32 are longitudinally spaced from one another across a gap 40 that allows at least for their relative movement. Bending motor 36 has its respective proximate and distal ends 241, 242 fixed to the respective portions 28, 32 with its unsupported region 243 between the ends, traversing and opposite the gap 40. Load assist structure 42 comprises the locally deflected (at 76) rails 72 extending from the suspension plane P-P and traversing the gap 40 on the left and right sides 101, 102 of the suspension.

In the invention, preferably, the bending system 36 alone supports the distal portion 32 from the proximate portion 28 and as noted the suspension 10 is free of a mechanical pivoting connection between the proximate and distal portions other than the bending system. Bending system 36 includes, in addition to the rails 72, the bending motor 38 comprised of a PZT 381, e.g. a differentially responsive PZT between opposed electrodes 44, 46 arranged to dimensionally vary, i.e. differentially expand or contract the PZT in lateral bending relation. In general, the PZT bending motor 38 comprises a single PZT 381 having opposite-direction poled portions 52, 54 between opposed electrodes 44, 46 arranged to differentially expand or contract the PZT in lateral bending relation. Alternatively, the PZT bending motor 38 comprises a single PZT 381 having like-direction poled portions 56, 58 between opposed electrodes 44, 46 arranged to differentially expand or contract the PZT in lateral bending relation.

Opposed electrodes typically include a grounding electrode 46 and a split electrode 441, 442 opposite the grounding electrode. As shown in FIGS. 6-9, the split electrode 44 can be symmetrically divided into first and second parts 441, 442. Then the PZT 381 has differentially responsive portions 52, 54 or 56, 58 registered respectively with the split electrode first and second parts 441, 442. Where the split electrode 44 is asymmetrically divided into first and second parts 441, 442, (FIGS. 2-4), the PZT has differentially responsive portions 52, 54, 56, 58 registered respectively with the split electrode first and second parts.

Typically, PZT 381 is elongated and less thick than wide between the opposed electrodes 44, 46, as noted above. Then, the split electrode 44 is elongated and has first and second longitudinally split parts 441, 442 in registered relation with the PZT portions 52, 54, 56, 58. The grounding electrode is typically but not necessarily common to both the parts 441, 442. Split electrode 44 is generally split longitudinally with its first and second parts 441, 442 having a like charge (FIG. 5B), the PZT 381 having its first and second portions 52, 54 opposite the split electrode first and second parts respectively, the PZT portions being different direction poled.

Split electrode 44 can be split longitudinally with its first and second parts 441, 442 having a different charge (FIG. 5A), the PZT 381 having its first and second portions opposite the split electrode first and second parts respectively. In this case, the PZT portions 56, 58 are same direction poled.

Figure 10:
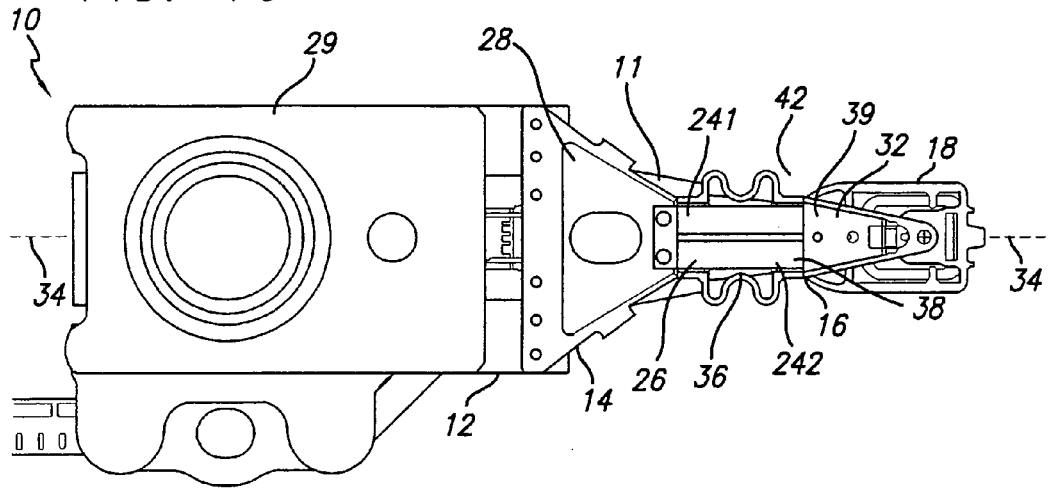
FIG. 10 is a top plan view of a further embodiment.

With reference to FIGS. 10-11, microactuated disk drive suspension 10 includes distal or forward of spring section 14 relatively movable proximate and distal suspension portions 28, 32 respectively, corresponding to the relatively fixed suspension portion 28 and the relatively movable suspension portion 32 previously discussed. In FIGS. 12 and 13 the proximate and distal suspension portions 28, 32 are proximate or rearward of spring portion 14. In either case, these proximate and distal portions 28, 32 lie on a common axis 34 extending centrally and longitudinally of the suspension 10. Proximate and distal portions 28, 32 are shown to be joined by a bending system 36 cantilevered from a suspension portion, here proximate portion 28. Bending system 36 in one embodiment consists of microactuator 24 defining a cantilevered bending motor 38 mounted on top side 39 of the suspension 10 to oppose the common axis 34 either for its full length where the motor is paraxial with the axis 34, or for some portion of its length where some portion of the motor lies across some portion of the common axis.

Bending motor 38 as in the FIGS. 1-5 embodiments is a typically elongated device capable of dimensional variation responsive to application of a voltage with one device end 241 directly supported by and fixed to the suspension 10 at relatively immovable and proximate portion 28, another end 242 attached to the movable portion 32 with an unsupported (i.e. not directly supported but cantilevered), laterally bendable region 243 between the ends 241, 242 that is free of attached support other than said ends.

The suspension 10 further includes edges 11 and at the edges a cantilevered laterally bendable load assist structure 42 extending along and spaced from the bending motor 38 in the same plane as the bending motor, e.g. FIGS. 10, 11 and 13. or in a plane parallel to the plane of the bending motor, e.g. FIG. 12, that is arranged to block undue loading of the bending motor unsupported region 243. Load assist structure is preferably predisposed to bend laterally while resisting bending vertically. The provision of locally deflections 421 at a locus 423 along the length of the assist structure 42 defines bending zones 424. Typically, the bending zones 424 have a single deflection 4211 of constant radius, see FIGS. 11 and 13, or a double deflection 4212 each part of which is of a constant radius, see FIG. 10, or a single deflection of a non-constant radius, e.g. a V-shaped deflection, see FIG. 7. Edges 11 are typically fabricated from the material of the suspension, e.g. a spring metal such as stainless steel, and are formed as runners or rails 72 in the plane P-P of the adjacent suspension portion 32, see FIG. 12, above or below the plane P-P of the adjacent suspension portion, e.g. 32, see FIGS. 10, 11 and 13, in the thickness of the adjacent portion, see FIGS. 12 and 13 and typically bent out of the portion plane at an angle or simply extended in the portion plane, cf. FIGS. 12 and 15.

With further reference to FIGS. 10-15, the invention further provides a microactuated disk drive suspension 10 comprising relatively movable proximate and distal suspension portions 28, 32 on a common axis 34 solely joined by a bending system 36 cantilevered from suspension portion 28 and consisting of a microactuator 24 on the top side 39 of the suspension defining a cantilevered bending motor 38 opposing the common axis and having a laterally bendable, unsupported region 243, and a cantilevered laterally bendable load assist structure 42 extending along and spaced from the bending motor and arranged to block undue loading of the bending motor unsupported region. The load assist structure 42 locally deflected, e.g. at 421, to be readily bendable there in preference to bending of the suspension portions, as hereinabove described.

With further reference to FIGS. 10-15, the invention provides a microactuated disk drive suspension 10 embodiment that is mechanical pivot connection-free; that is the relatively movable proximate and distal portions 28, 32 connected by the bendable motor 38 and the load assist structure 42 are free of additional connecting structure that is mechanical (i.e. of sufficient physical size and strength) to act as a fulcrum for pivoting movement of the moving portion 32 relative to the unmoving portion 28. Flexible circuit layers extending between portions 28 and 32, while typically present in a complete suspension 10, are not of sufficient size and strength to act as a fulcrum for pivoting of these portions. In this embodiment, too, the relatively movable proximate and distal suspension portions 28, 32 lie on a common axis 34 joined by a bending system 36 cantilevered from a suspension portion and comprising a microactuator 24 including a cantilevered bending motor 38 mounted on the top side 39 of the suspension 10 having a laterally bendable, unsupported region 243, and a cantilevered laterally bendable load assist structure 42 extending along and spaced from the bending motor and arranged to block undue loading of the bending motor unsupported region.

In the embodiments of FIGS. 10-15, typically, the microactuator bending motor 38 comprises a PZT 381 electrically connected at pads 41 below the PZT to be differentially responsive when positioned between opposed electrodes 44 (symmetrically or asymmetrically divided into parts 441, 442 that are face up, FIGS. 12, 13, or face down, FIGS. 14, 15) as previously described in connection with the FIGS. 1-9 embodiments.

In many of the foregoing embodiments, the microactuated disk drive suspension 20 further includes a mounting plate 29, and a flexible circuit 30 carried by the suspension.

The invention method of manufacturing a disk drive suspension includes providing relatively movable proximate and distal portions 28, 32 and coupling the portions with a bending system 36 cantilevered from the proximate portion and comprising a microactuator 24 comprising a cantilevered bending motor 38 having a laterally bendable unsupported region 243, and a cantilevered laterally bendable load assist structure 42 arranged to block undue loading of the bending motor unsupported region.

The invention method of positioning a slider 22 with the suspension 22 includes bending the suspension between relatively movable proximate and distal portions 28, 32 thereof with a bending system 36 cantilevered from the proximate portion and comprising a bending motor 38 having a laterally bendable unsupported region 243, and a cantilevered laterally bendable load assist structure 42 arranged to block undue loading of the bending motor unsupported region.

In these and like embodiments, typically, the methods include defining the load assist structure with edges 11 on the suspension 20 suitably formed into rails 72 and selecting a PZT 381 as the bending motor 38.

Where a PZT 381 has differentially poled adjacent portions, correct installation of the device can be problematic as the parts are small and difficult to label where the left and right portions are differently sized or poled and must be installed in a particular way. In accordance with one aspect of the invention an asymmetric marking or indicium is provided corresponding to and thus indicative of the portion size and by association the poling direction. The invention, with reference to FIG. 2 for example, thus includes a method of marking poling directions in a single PZT device 381 having simultaneously different poling directions, see arrows, in adjacent portions 52, 54, including determining the location of the boundary B-B between device portions having different poling directions, and placing visually detectable indicia 82 on a surface 84 of the device at the boundary in a manner providing asymmetrically sized first and second surface areas 86, 88 on either side of the boundary at least one of which areas corresponds to a single poling direction in the device. The product of the method includes a PZT device having differently poled portions 52, 54 on opposite sides of a boundary B-B, the device having visually detectable indicia 82 on a surface 84 thereof at the boundary, the indicia defining asymmetrically sized first and second surface areas 86, 88 at least one of which corresponds to a single poling direction.

In summary, the invention thus provides an improved disk drive suspension that uses a single bending motor PZT to laterally relatively shift respective suspension portions for slider placement opposite a disk track using the single PZT free of added pivot structure. The invention further simplifies and thus lowers the cost of electrical connection to the PZT. The invention further provides indicia on the PZT enabling visual determination of correct polarity a feature combinable with dividing the PZT asymmetrically rather than symmetrically, and provides a single PZT having one common ground electrical connection and at least two opposing connections to enable bending of the PZT by appropriate application of suitable sign voltages relative to the predetermined polarity of the PZT portions, and the application of a single polarity voltage to an oppositely poled pair of PZT portions for bimorph response of bending, or application of a positive or negative voltage to like paired portions for a bimorph response of bending. The foregoing objects are thus met.

We claim:

1. A microactuated disk drive suspension comprising relatively movable proximate and distal suspension portions on a common axis joined by a bending system cantilevered from a said suspension portion and consisting of a cantilevered bending motor opposing said common axis and having a laterally bendable region free of attached support, and a cantilevered laterally bendable load assist structure extending along and spaced from said bending motor and arranged to block undue loading of said bending motor unsupported region.

2. A microactuated disk drive suspension comprising relatively movable proximate and distal suspension portions on a common axis solely joined by a bending system cantilevered from a said suspension portion and consisting of a cantilevered bending motor opposing said common axis and having a laterally bendable, unsupported region, and a cantilevered laterally bendable load assist structure extending along and spaced from said bending motor and preferentially bendable to bend in preference to bending of said suspension portions and arranged to block undue loading of said bending motor unsupported region.

3. A microactuated disk drive suspension comprising a mechanical pivot connection-free, relatively movable proximate and distal suspension portions on a common axis joined by a bending system cantilevered from a said suspension portion and comprising a cantilevered bending motor opposing said common axis and having a laterally bendable, unsupported region, and a cantilevered laterally bendable load assist structure extending along and spaced from said bending motor and arranged to block undue loading of said bending motor unsupported region.

4. The microactuated disk drive suspension according to claim 3, in which said bending motor comprises a PZT.

5. The microactuated disk drive suspension according to claim 4, in which said PZT bending motor comprises a differentially responsive PZT between opposed electrodes arranged to differentially expand or contract said PZT in lateral bending relation.

6. The microactuated disk drive suspension according to claim 4, in which said PZT bending motor comprises a single PZT having opposite-direction poled portions between opposed electrodes arranged to differentially expand or contract said PZT in lateral bending relation.

7. The microactuated disk drive suspension according to claim 4, in which said PZT bending motor comprises a single PZT having like-direction poled portions between opposed electrodes arranged to differentially expand or contract said PZT in lateral bending relation.

8. The microactuated disk drive suspension according to claim 5, in which said opposed electrodes include a grounding electrode and a split electrode opposite said grounding electrode.

9. The microactuated disk drive suspension according to claim 8, in which said split electrode is symmetrically divided into first and second parts, said PZT having differentially responsive portions corresponding to said split electrode first and second parts.

10. The microactuated disk drive suspension according to claim 8 in which said split electrode is asymmetrically divided into first and second parts, said PZT having differentially responsive portions corresponding to said split electrode first and second parts.

11. The microactuated disk drive suspension according to claim 8, in which said PZT is elongated and less thick than wide, said split electrode is elongated and has first and second longitudinally split parts, and said grounding electrode is common to both said parts.

12. The microactuated disk drive suspension according to claim 11, in which said split electrode is split longitudinally with its said first and second parts having a like charge, said PZT having first and second portions opposite said split electrode first and second parts respectively, said PZT portions being opposite direction poled.

13. The microactuated disk drive suspension according to claim 11, in which said split electrode is split longitudinally with its said first and second parts having a different charge, said PZT having first and second portions opposite said split electrode first and second parts respectively, said PZT portions being same direction poled.

14. A microactuated disk drive suspension for supporting a slider at a disk, said suspension comprising a mount plate, a load beam extending in a plane and having on a common axis a base section adapted for mounting to an actuator by said mount plate, a spring section and a beam section carrying a flexure and said slider thereon, said suspension having relatively movable proximate and distal portions on said common axis joined by a bending system cantilevered from said proximate portion and comprising a cantilevered bending motor opposed to said common axis and having a laterally bendable unsupported region, and a cantilevered laterally bendable load assist structure arranged to block undue loading of said bending motor unsupported region.

15. The microactuated disk drive suspension according to claim 14, in which said suspension plane has a first side and a second side, said suspension having left and right edges defining said load assist structure.

16. The microactuated disk drive suspension according to claim 15, in which said bending motor is located at said suspension plane first side and distal to said spring section.

17. The microactuated disk drive suspension according to claim 15, in which said bending motor is located at said suspension plane second side and distal to said spring section.

18. The microactuated disk drive suspension according to claim 14, in which said suspension proximate and distal portions are longitudinally spaced across a gap, said bending motor having respective ends fixed to said respective portions with its said unsupported region between said ends and opposite said gap, said load assist structure comprising locally deflected rails extending between said suspension proximate and distal portions and traversing said gap on the left and right edges of said suspension.

19. The microactuated disk drive suspension according to claim 18, in which said rails are each doubly deflected between said suspension proximate and distal portions.

20. The microactuated disk drive suspension according to claim 18, in which said rails are deflected on a constant radius.

21. The microactuated disk drive suspension according to claim 18, in which said rails are deflected on a varying radius.

22. The microactuated disk drive suspension according to claim 14, in which said bending motor has a proximate end and a distal end with said unsupported region therebetween and otherwise free of attachment.

23. The microactuated disk drive suspension according to claim 14, in which said bending system alone supports said distal portion from said proximate portion.

24. The microactuated disk drive suspension according to claim 14, in which said suspension is free of a mechanical pivoting connection between said proximate and distal portions other than said bending system.

25. The microactuated disk drive suspension according to claim 14, in which said suspension defines a pivoting connection between said proximate and distal portions in addition to said bending system.

26. The microactuated disk drive suspension according to claim 14, in which said bending motor comprises a PZT.

27. The microactuated disk drive suspension according to claim 26, in which said PZT bending motor comprises a differentially responsive PZT between opposed electrodes arranged to differentially expand or contract said PZT in lateral bending relation.

28. The microactuated disk drive suspension according to claim 27, in which said PZT bending motor comprises a single PZT having opposite-direction poled portions between opposed electrodes arranged to differentially expand or contract said PZT in lateral bending relation.

29. The microactuated disk drive suspension according to claim 27, in which said PZT bending motor comprises a single PZT having like-direction poled portions between opposed electrodes arranged to differentially expand or contract said PZT in lateral bending relation.

30. The microactuated disk drive suspension according to claim 29, in which said opposed electrodes include a grounding electrode and a split electrode opposite said grounding electrode.

31. The microactuated disk drive suspension according to claim 30, in which said split electrode is symmetrically divided into first and second parts, said PZT having differentially responsive portions registered respectively with said split electrode first and second parts.

32. The microactuated disk drive suspension according to claim 30, in which said split electrode is asymmetrically divided into first and second parts, said PZT having differentially responsive portions registered respectively with said split electrode first and second parts.

33. The microactuated disk drive suspension according to claim 30, in which said PZT is elongated and less thick than wide between said opposed electrodes, said split electrode is elongated and has first and second longitudinally split parts in registered relation with said PZT portions, said grounding electrode being common to both said parts.

34. The microactuated disk drive suspension according to claim 33, in which said split electrode is split longitudinally with its said first and second parts having a like charge, said PZT having first and second portions opposite said split electrode first and second parts respectively, said PZT portions being different direction poled.

35. The microactuated disk drive suspension according to claim 33, in which said split electrode is split longitudinally with its said first and second parts having a different charge, said PZT having first and second portions opposite said split electrode first and second parts respectively, said PZT portions being same direction poled.

36. The microactuated disk drive suspension according to claim 14, including also a flexible circuit carried by said suspension.

37. A method of manufacturing a disk drive suspension including providing relatively movable proximate and distal portions and coupling said portions with a bending system cantilevered from said proximate portion and comprising a cantilevered bending motor having a laterally bendable unsupported region, and a cantilevered laterally bendable load assist structure arranged to block undue loading of said bending motor unsupported region.

38. The method according to claim 37, in which said suspension has edges, and including also defining said load assist structure with said edges.

39. The method according to claim 37, including also selecting a PZT as said bending motor.

40. A method of operating a disk drive suspension including positioning a slider with said suspension, and bending said suspension between relatively movable proximate and distal portions thereof with a bending system cantilevered from said proximate portion and comprising a bending motor having a laterally bendable unsupported region, and a cantilevered laterally bendable load assist structure arranged to block undue loading of said bending motor unsupported region.

41. The method according to claim 40, in which said suspension has edges, and including also defining said load assist structure with said edges.

42. The method according to claim 41, including also selecting a PZT as said bending motor.

43. The microactuated disk drive suspension according to claim 1, wherein:
said bending motor comprises a single PZT device having simultaneously different poling directions;
said PZT device has visually detectable indicia on a surface thereof at a boundary between device portions having said different poling directions, said visually detectable indicia providing asymmetrically sized first and second surface areas on either side of said boundary at least one of which areas corresponds to a single poling direction in said device.

44. The microactuated disk drive suspension according to claim 4, wherein:
said PZT device has visually detectable indicia on a surface thereof at a boundary between device portions having said different poling directions, said visually detectable indicia providing asymmetrically sized first and second surface areas at least one of which corresponds to a single poling direction.

45. The microactuated disk drive suspension according to claim 14, wherein:
said bending motor has visually detectable indicia on a surface thereof at a boundary between device portions having said different poling directions, said visually detectable indicia providing asymmetrically sized first and second surface areas at least one of which corresponds to a single poling direction.

* * * * *